W. HOLLEY.
TRAP.
APPLICATION FILED MAR. 28, 1913.

1,122,202.

Patented Dec. 22, 1914.
2 SHEETS—SHEET 1.

Witnesses
Inventor
W. Holley,
By Victor J. Evans
Attorney

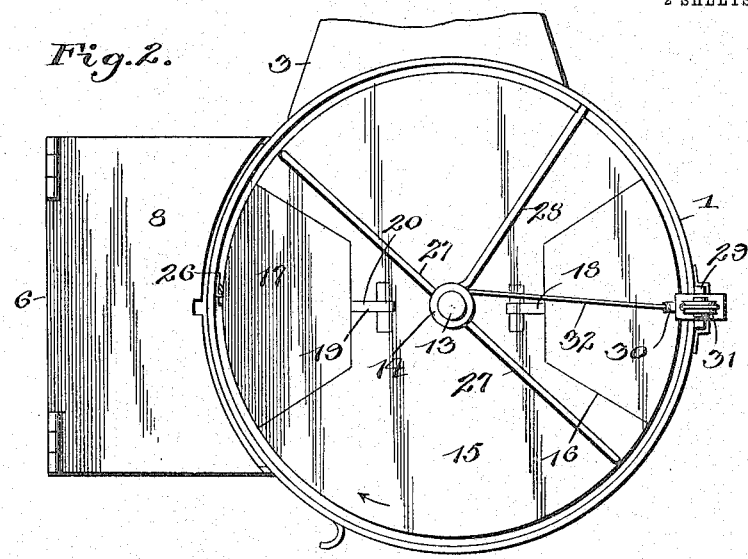
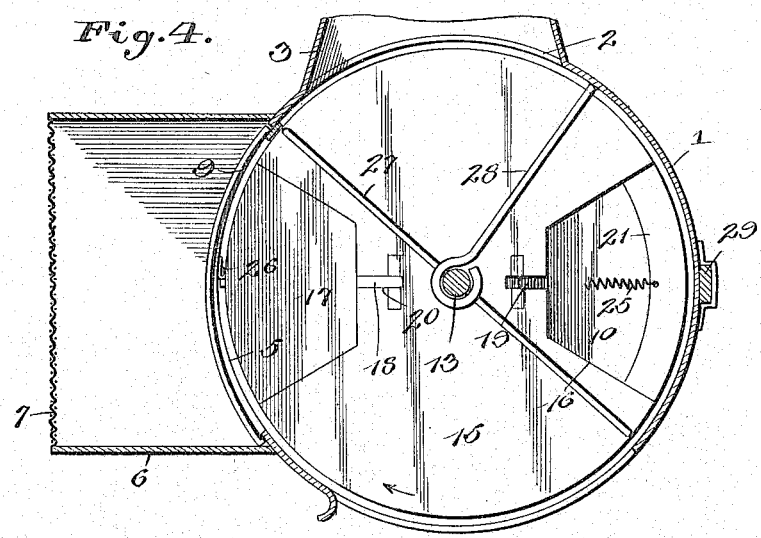
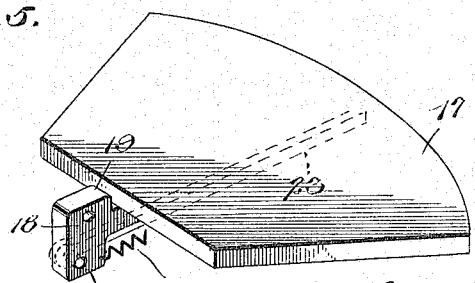

UNITED STATES PATENT OFFICE.

WILLIAM HOLLEY, OF CHEHALIS, WASHINGTON.

TRAP.

1,122,202.　　　　　Specification of Letters Patent.　　Patented Dec. 22, 1914.

Application filed March 28, 1913. Serial No. 757,438.

*To all whom it may concern:*

Be it known that I, WILLIAM HOLLEY, a citizen of the United States, residing at Chehalis, in the county of Lewis and State of Washington, have invented new and useful Improvements in Traps, of which the following is a specification.

The invention relates generally to improvements in traps, and particularly to a trap designed for use in connection with any suitable type of corral and operating to attract the animals within the trap inclosure and compelling their exit therefrom into the corral.

The main object of the present invention is the provision of a trap which can be readily arranged in connection with any suitable type of corral and which is constructed to initially attract the animal through its endeavor to reach the contained bait, the operation of the parts being automatically controlled by the presence of the animal within the trap, with such parts serving when operated to compel the animal to pass from the trap through the entrance connection between the trap and corral.

The invention in its preferred form of details will be described in the following specification, reference being had particularly to the accompanying drawings, in which:—

Figure 1:
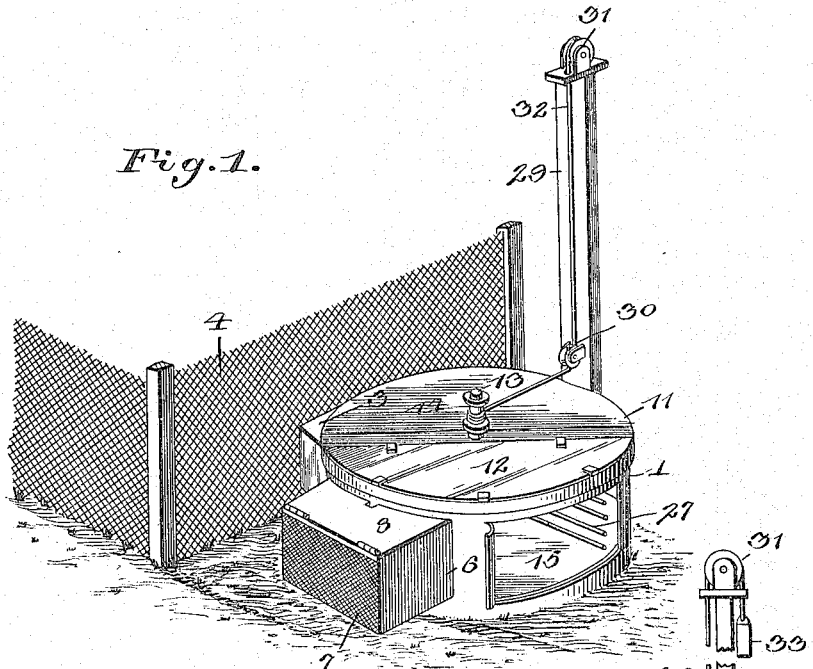
Figure 3:
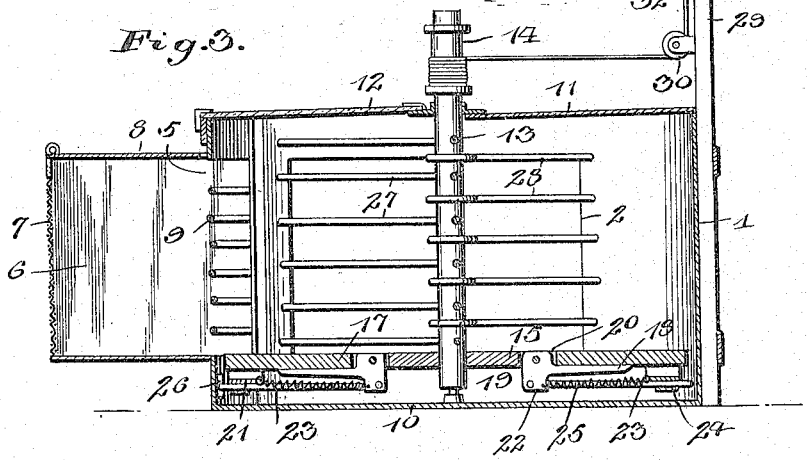
Figure 6:
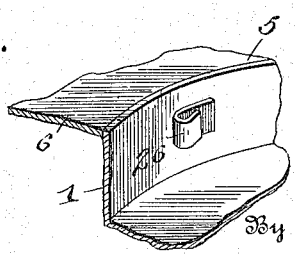

Figure 1 is a perspective view illustrating the trap and showing its connection with a simple type of corral. Fig. 2 is a plan of the trap with the top removed. Fig. 3 is a vertical section of the trap. Fig. 4 is a horizontal section. Fig. 5 is a perspective view of the operating platform removed. Fig. 6 is a perspective of the details showing means for holding the trap inoperative except in the presence of the animal in the trap plate.

Referring particularly to the accompanying drawings, the improved trap comprises a casing 1 preferably of circular form having an entrance opening 2 and formed diametrically opposite with a walled outlet 3 forming a covered runway leading to and opening into the corral inclosure 4. It is of course understood that the object is to entrap the animals and force them to enter the corral and aside from the specific details hereinafter mentioned the general features of the trap as well as the specific feature of the corral may be of any preferred type.

The circular wall of the casing is formed intermediate the entrance opening and outlet with another opening 5 which communicates with the bait receptacle 6 secured to the outer surface of the trap and having an outer screen wall 7 and a hinged cover 8. The bait is designed to be placed in the bait receptacle and to attract the animal by sight and odor of the bait reach the animal through the screen wall. The opening 5 communicating with the bait receptacle is barred therefrom by horizontally arranged bars or rods 9 by which the animal is prevented from reaching the bait from the interior of the trap. The bottom wall 10 of the casing is of solid type, while the top wall 11 preferably includes a section 12 through which light may be reached into the interior of the trap, this section preferably reaching from the entrance opening 2 to a point beyond the bait receptacle, so that the bait is at all times visible to the animal in entering the trap.

A shaft 13 is mounted centrally of the casing, being supported in the upper and lower walls and having an operating section 14 projecting above the upper wall, for a purpose which will presently appear. Fixed upon the shaft within the casing is a platform 15, said platform preferably approximates the interior diameter of the casing being of sufficient thickness and of such material as to support the weight of the animal which it is designed to trap. At diametrically opposed points the platform is cut out as at 16, the side walls of the cut out portion being preferably on radial lines. The depth of the cut out portion which extends from the peripheral edge of the platform has less than the radial length of the platform and to the platform in line with the cut out portion there is hingedly connected what I term a trip plate 17. The trip plate corresponds in size and shape to that of the cut out portion and is further approximately of equal thickness to the platform, so that when the parts are in operative position the trip plates in effect complete the continuity of the platform. The trip plate is preferably supported upon a hinged bar 18, the forward end of which is connected by a hinged connector 19 in a radial slot 20 formed in the platform, and to prevent an unnecessary depression of the trip plate I secure to the platform beneath the trip plate a stop bar 21 which in line with the cut out portion of the platform is depressed or offset to permit a relatively downward movement of the trip plate. Secured to a lug 22 depending from the hinged bar 18 adjacent its connection is a locking bar 23 the outer end of which is supported in a hanger 24 carried by and beneath the stop plate. A spring 25 connects the lug 22 with the stop bar 21, the spring serving to maintain the platform in normal position, that is in coincidence with the upper surface of the platform, under which conditions the free or outer end of the locking bar is practically in contact with the inner surface of the wall of the casing. At a point about centrally of the opening leading to the bait receptacle, the casing wall below the lower edge of said opening is provided with a stop 26 with which the respective locking bars are adapted to coöperate when said bars are in normal position, the relative size and disposition of the parts involving these features being such that upon the depression of the trip plate to its limit under the influence of the weight of the animal thereon the locking bar will be moved inwardly or withdrawn from coöperation with the stop 26.

The platform is provided with what I term a rigid gate, that is a series of bars extending through the shaft 13 on which platform is secured, said bars extending the full diametric length of the platform and completely dividing the platform spaces between said platform and top wall of the casing into two distinct compartments. The gate bars 27 which are vertically spaced apart so as to prevent the passage of the animal between them, are arranged on that diametric line of the platform which passes between the trip plates and closely adjacent to one side edge of such plates, so that a trip plate is in each portion of the platform divided by the gate and in any stop position of the platform the gate closes the entrance opening from the outlet. A casing gate or series of bars 28 is also provided, said bars being formed at their inner ends to rotatably receive the shaft being connected at their outer ends to the casing wall immediately beyond that wall of the outlet remote from the bait receptacle. The bars 28 of the casing gate extend from the shaft 13 to the wall of the casing only, that is approximately equal to the radial length of the casing, said bars 28 being so spaced apart that the bars 27 of the platform gate may pass between them in the movement of the platform.

Secured to the casing at a point preferably diametrically opposite the bait receptacle is an upright 29 on which near the lower end is supported a pulley 30, another pulley 31 being supported at the upper end. A cable or operating cord 32 passes over the upper pulley and beneath the lower pulley being terminally secured to the upper section 14 of the shaft 13. The opposite end of the cable depends in rear of the support and is adapted to receive appropriate weight 33. The trap is set by winding the cable about the upper section so that the weight if free to operate, will rotate the platform through the connection described. In set position it will be understood that the locking bar 23 engaging the stop 26 holds the platform against the rotative influence of the weight and cable and that in this position of the parts one of the trip plates is about alined with the center of the bait receptacle and the platform gate extends across the platform from the remote edge wall of the bait receptacle and the remote edge wall of the entrance opening. The animal attracted by the bait attempting to reach same, enters the casing through the entrance opening and walks on to the platform. When about opposite the bait receptacle the weight of the animal on the trip plate withdraws the locking bar 23 and the stop 26, and the weight actuates the platform in the direction of the outlet. Immediately succeeding the initial movement of the platform, the platform gate closes the entrance opening and the animal is pushed by said gate in further movement of the platform toward the outlet. Opposite the outlet the animal finds its further progress with the platform barred by the casing gate and will to avoid the following platform and gate, pass through the outlet into the corral. Of course, it will be obvious that a partial, or to be exact one-half rotation of the platform only is necessary for the trapping of a single animal, as the cable may be wound many times about the operating section of the shaft, the trap when set will automatically operate for trapping of several animals. This will be apparent from a knowledge of the fact that the locking bar 23, when the trip plate is relieved of the weight of the animal is always in position to engage the stop, so that in the operation described through the actuation of one trip bar, the platform after forcing the animal therefrom through the outlet will continue its rotation until the locking bar of the other trip plate engages the stop, and the trip is automatically set for the next animal.

It is of course to be understood that any appropriate material may be used for different parts of the trip and that the trip as a whole is to be made in such variety of sizes as will enable appropriate size trap to be used for a particular animal.

What is claimed is:—

A trap for use with a corral including a casing having an entrance opening and an outlet communicating with the corral, a stop formed on said casing, a platform mounted in the casing and having cut out portions, means for rotating the platform, diametrically opposite trip plates, means carried by the bottom surface of said plates for pivotally mounting the latter in the cut out portions of the platform, diametrically opposed rods carried by the latter mentioned means and adapted to coöperate with the stop of the casing for locking the platform, said diametrically opposed rods being operated by the trip plates, a series of spaced bars extending diametrically of the platform between the trip plates and forming a division gate, and a series of spaced bars carried by the casing and overlying the platform.

In testimony whereof I affix my signature in presence of two witnesses.

WILLIAM HOLLEY.

Witnesses:
 ALBERT SCHOOLEY,
 EDWARD DEGGELLER.

Copies of this patent may be obtained for five cents each, by addressing the "Commissioner of Patents. Washington, D. C."